United States Patent [19]

Dale, Jr.

[11] 4,444,496

[45] Apr. 24, 1984

[54] 4-WHEEL ALIGNMENT METHOD AND APPARATUS

[75] Inventor: James L. Dale, Jr., Conway, Ark.

[73] Assignee: FMC Corporation, Chicago, Ill.

[21] Appl. No.: 300,153

[22] Filed: Sep. 8, 1981

[51] Int. Cl.³ .......................................... G01B 11/275
[52] U.S. Cl. ...................................... 356/155; 33/228; 33/288
[58] Field of Search ............................... 356/155, 256; 33/203.18, 228, 288

[56] References Cited

U.S. PATENT DOCUMENTS

| 3,159,916 | 12/1964 | Hunter . | |
| 3,206,862 | 9/1965 | Hunter | 33/288 |
| 3,402,905 | 9/1968 | MacMillan | 33/203.18 |
| 3,561,849 | 2/1971 | Carrigan | 356/155 |
| 3,576,372 | 4/1971 | Baker | 356/155 |
| 4,106,208 | 8/1978 | Hunter | 33/288 |
| 4,337,581 | 7/1982 | Eck | 356/155 |

Primary Examiner—William H. Punter
Attorney, Agent, or Firm—H. M. Stanley; R. B. Megley

[57] ABSTRACT

A wheel alignment process using manually operable alignment apparatus wherein all four wheels of a vehicle having a front steerable wheel pair and a rear non-steerable wheel pair may be set in toe without turning the vehicle around part way through the process. The process provides for setting both front and rear toe relative to the chassis centerline in one aspect of the disclosure and for setting rear toe as close as practical to the chassis centerline and the front toe relative to the rear wheel rolling direction in another aspect of the disclosure. A lock is also disclosed which assures stability of the reference for the front and rear toe settings during the practice of the toe setting process.

11 Claims, 9 Drawing Figures

4-WHEEL ALIGNMENT METHOD AND APPARATUS

BACKGROUND OF THE INVENTION

1. Field of the Invention

This invention relates to apparatus and method for setting toe on all four wheels of a four wheeled vehicle utilizing manually operable equipment.

2. Description of the Prior Art

In the past a manually operable wheel aligner called the Acraliner was used to first adjust a wheel pair at one end of a vehicle and then, after the vehicle had been turned end for end, to adjust the wheel pair at the other end of the vehicle. Caster, camber and toe were set by the Acraliner equipment. Aligner head mounting clamps were applied to the wheel rims at one end of the vehicle. The clamps carried a platform with manual adjustment structure so that the run-out or departure of the wheel rim from an average rotational plane could be adjusted out of the platform. A projection head was mounted to the platform projecting a light array either forwardly or rearwardly from the wheel on which mounted depending on the position to which the projection head was turned on the platform. A projection screen was formed on the projection head to receive reflected images of the light array projected therefrom. The caster and camber were adjusted in the wheel pair using apparatus and processes not pertinent to this disclosure. A mirror bar was mounted for movement in a panel situated proximate to the wheel pair being measured. The mirror bar was adjusted in position to intercept the light array from the projector head and thereby functioned to reflect the light array back to the screen formed on the projector head. Positionable targets were placed against wheels of the vehicle more distant from the panel and the direction of projection from the projector heads was reversed to impinge on the targets. The wheels closest to the panel were moved in steering until the zero mark in one light array intercepted the zero mark on the associated positionable target. A position of the index mark from the other light array on the other positionable target was noted and the wheels on which the light projectors were mounted were turned until the projected index marks indicated half of the last reading noted on each scale. The projectors were rotated to project the light arrays forwardly without moving the steerable wheels. The projected light arrays thereby were intercepted by the reflectors on the mirror bar so that a reflected light array was directed back to the projection screens on the projection heads. The mirror bar was then adjusted so that the toe readings were equal on each head target. The tie rods for the steerable wheels, preloosened so that accidental shifting of the steering would not occur, were then adjusted to obtain the proper toe on each wheel when the steering wheel was in the level or straight ahead driving position. As a general rule the toe was set with half of the total toe in the left hand wheel and half of the total toe in the right hand wheel for the straight ahead position.

Other prior art systems are known wherein a vertically oriented light stripe is projected instead of a light array or wherein an optical path may be viewed rather than projecting a light array. In such systems 4-wheel alignment requires that the wheel at one end of the vehicle be set in toe and the vehicle long axis then be reversed to set the other pair of wheels in toe.

SUMMARY OF THE INVENTION

The invention disclosed herein relates to a method of setting toe for wheels supporting the chassis of a vehicle having pairs of steerable front and non-steerable rear wheels and a steering wheel for controlling the steerable wheels. The method involves the utilization of apparatus which includes a pair of reversable projector heads having projection screens thereon and operating to project a light array in a direction substantially parallel to the plane of rotation of a wheel on which mounted. The light array includes a scale reference position. A panel support structure is adapted to be situated at one end of a position for receiving the vehicle and the support structure has a mirror bar supported therein which is adjustable in orientation and which has reflecting surfaces mounted thereon. A pair of positionable targets are provided as well as wheel clamps for each of the four wheels. The wheel clamps are adapted to be mounted on the wheels and to receive the projector heads. The method includes the steps of mounting the pair of alignment heads one on each of the steerable front wheels and placing one of the positionable targets on each side of and at the rear of the chassis substantially equidistant from a point midway between the rear wheel pair. The light arrays are projected rearwardly to strike the positionable targets and the front wheel pair is steered until the scale reference marks strike similar points on the positionable targets. The light arrays are then directed forwardly to strike the reflecting surfaces on the mirror bar. The orientation of the mirror bar is adjusted until the reflected scale reference marks strike the head screens at similar points thereon. The steering wheel is rotated to a centered steering position and the toe of each front wheel is set to a desired toe position using the projected light arrays as toe position indicators. The pair of alignment heads are then mounted one on each of the rear wheels and the light arrays are projected forwardly therefrom. The toe of each rear wheel is set to a desired toe position using the projected light arrays as toe position indicators.

In accordance with another aspect of the invention a method is defined for setting the toe of four wheels supporting a vehicle chassis including two steerable front wheels controlled by a steering wheel and two non-steerable rear wheels. Apparatus is utilized in the method which includes a pair of reversable projector heads each having a projection screen thereon and operating to project a light array in a direction substantially parallel to the rotation plane of a wheel on which the head is mounted. The light array includes a scale reference mark. A panel support structure is situated at one end of a position for receiving the vehicle. The support structure has a mirror bar mounted therein which is adjustable in orientation and which has reflecting surfaces mounted thereon. A pair of positionable targets is provided as well as a wheel clamp for each of the four wheels. The wheel clamps are adapted to be mounted on the wheels and to receive the projector heads. The method includes the steps of mounting one of the alignment heads on each of the pair of front wheels and placing one of the positionable target on each side of and at the rear of the chassis substantially equidistant from a point midway between the rear wheel pair. The light arrays are projected rearwardly to impinge on the positionable targets and the front wheel pair is steered until the scale reference marks strike similar points on the positionable targets. The light arrays are then projected forwardly to strike the reflecting surfaces on the mirror bar. The orientation of the mirror bar is adjusted until the reflected scale reference marks strike the head screen at similar points thereon. One of the alignment heads is then mounted on each of the pair of rear wheels and the light arrays are projected forwardly. The toe of each rear wheel is then set to be approximately the same using the projected light arrays to indicate the toe position. The mirror bar orientation is readjusted in the event the toe of each rear wheel is slightly different so that the rear toe readings appear to be split on the projection head screens. One of the alignment heads is then mounted on each of the pair of front wheels and the light arrays are projected forwardly. The steering wheel is rotated to a centered steering position and the toe of each front wheel is set to a desired toe position using the projected light arrays as toe position indicators.

In accordance with another aspect of the invention the aforementioned apparatus for setting the toe of front steerable and rear non-steerable wheels supporting the vehicle chassis is described together with a translational lock mounted in the support structure in contact with the mirror bar so that when the lock is engaged it operates to fix the mirror bar translationally but not rotationally.

DESCRIPTION OF THE PREFERRED EMBODIMENTS

In a four wheel alignment system the desired results to be obtained are proper total toe in the front and rear wheels, proper tracking of the rear wheels behind the steerable front wheels, and a "level" steering wheel when the vehicle is rolling in a straight ahead direction. The invention disclosed herein relates to measurement and adjustment of toe to obtain the aforementioned results. Alternatively stated there are three primary conditions which must be met to achieve proper adjustment of toe on all four wheels of a vehicle having a front steerable wheel pair and a rear non-steerable wheel pair. First, the total toe of the wheel pair at each axle must be set to manufacturer's specifications to achieve good tire wear and proper vehicle handling. Second, the rear wheels should track properly behind the front wheels to obtain good vehicle handling. Third, as a matter of steering comfort, the steering wheel should be centered or "leveled" (with reference to the steering wheel symmetry) when the vehicle is traveling in a straight line.

It should be noted that the direction in which the vehicle will roll when traveling in a straight line is determined by the toe setting of the rear wheels. When the rear axle on a vehicle is skewed, but the front wheels are steered straight ahead, when the vehicle rolls it will turn in a direction opposite to the rear axle skew. A driver must then steer the front wheels in the direction of the rear axle skew to get the vehicle to travel in a straight line. The bisector of the angle formed between the planes of rotation of the rear wheels is termed the rear rolling direction (RRD) to which reference will be repeatedly made throughout the remainder of this specification. The front wheels must be steered in a direction parallel to the RRD to obtain a straight ahead rolling condition in the vehicle.

Proper tracking of the wheels in a four wheeled vehicle is achieved when the RRD is set (by adjusting rear individual toe) to go through a point which is midway between the front wheels. If the front and the rear wheel track widths are not the same, then proper tracking is achieved if the tracks are symmetric, i.e., the wide track symmetrically encompasses the narrow track. An off tracking condition exists when the rear wheels roll to one side or of the other of the track traveled by the front wheels when the vehicle is rolling in a straight ahead direction.

A centered or "leveled" steering wheel is accomplished by setting the front toe to be symmetric with the RRD when the steering wheel is held in a centered position. This may be seen when it is realized that the front wheels have to be steered in the same direction as the RRD for the vehicle to travel in a straight line.

Figure 1:
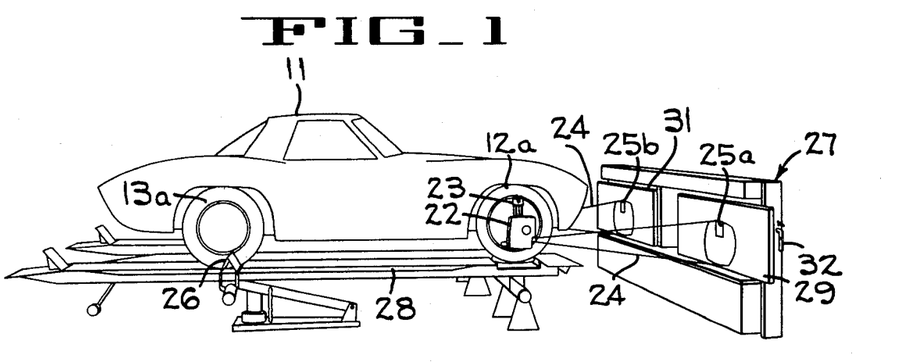
FIG. 1 is a perspective view of the apparatus used in the performance of the method of the present invention.
Figures 2, 4, 5, 8:
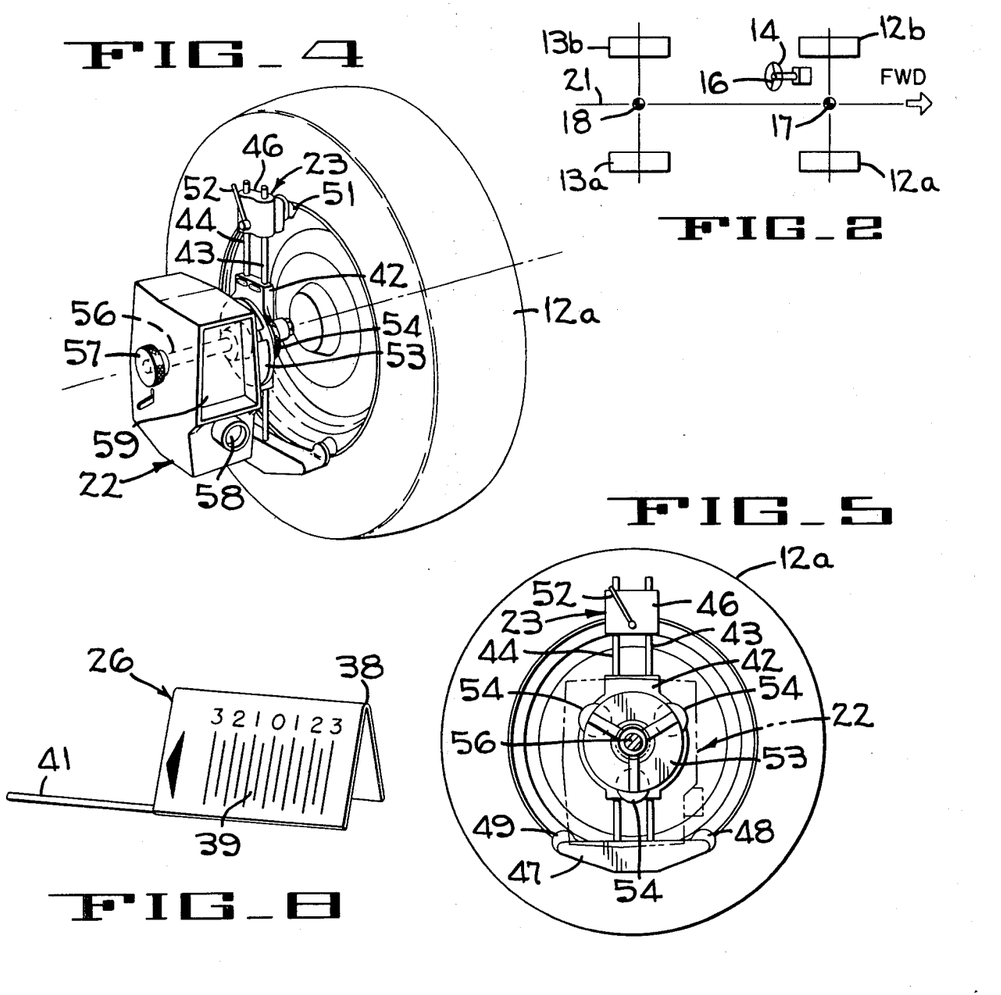
FIG. 2 is a diagrammatic view of the wheels of a vehicle upon which the novel method and apparatus may be used.
FIG. 4 is a perspective view of a vehicle wheel rim and tire with a wheel clamp and aligner projection head mounted thereon.
FIG. 5 is a side elevation of a wheel clamp on a vehicle wheel rim and tire.
FIG. 8 is a perspective view of a positionable target useful in the practice of the present invention.

A description of the apparatus necessary for practicing the novel processes for four wheel wheel alignment disclosed herein together with an improvement to the apparatus for practicing the novel processes will now be discussed. With reference to FIG. 1 of the drawings, a vehicle chassis 11 is shown being supported on four ground contact wheels including a pair of steerable front wheels 12a and 12b and a pair of non-steerable rear wheels 13a and 13b. A control for the front steerable wheels is provided which is seen in FIG. 2 as a steering wheel 14. The steering wheel generally has a member 16 which runs across its diameter. It is desirable that the member 16 be in a substantially horizontal position (as seen in FIG. 2) for the steering condition wherein the vehicle chassis is being steered to proceed in a generally straight ahead direction.

A center point 17 is seen in FIG. 2 located midway between the pair of front wheels 12a and 12b and a center point 18 is located midway between the pair of rear wheels 13a and 13b. The centerline of the chassis 11 is defined as a line 21 extending through the center points 17 and 18.

The alignment apparatus of FIG. 1 includes an alignment projection head 22 which is mounted by means of a clamp 23 on one of the four wheels 12a, 12b or 13a, 13b. The alignment head is mounted on the clamp so that the vehicle wheel may be rotated without rotating the alignment head. The means by which this is accomplished will be discussed in greater detail hereinafter. The alignment projection head is also configured to be positioned to project a light array 24 in a direction parallel to the plane of rotation of the vehicle wheel on which mounted either in the forward direction as seen in FIG. 1 or in a rearward direction toward a rearward located positionable target 26.

A support structure in the form of a panel 27 is positioned at one end of a space which is adapted to receive the vehicle chassis. One such panel is exemplified by the well known Acraliner wheel alignment system manufactured by FMC Corporation. The space adapted to receive the vehicle chassis adjacent to the panel position is shown in FIG. 1 as a hoist 28 supporting the vehicle. The hoist has attached thereto jacks for elevating any of the four vehicle wheels from the underlying hoist surfaces for purposes to be hereinafter described.

Only a brief description of the Acraliner alignment apparatus panel structure will be undertaken here as such apparatus is well known to those skilled in this art. A right movable panel 29 and a left movable panel 31 are mounted in the support structure and are adapted to slide laterally therein so that they may be placed relative to each of the pair of front wheels on vehicles having different wheel spacing width measurements. Each panel has therein an opening 25a and 25b respectively which will allow a portion of the light array 24 projected by the projection heads 22 to pass through the surface of the panel.

Figure 3:
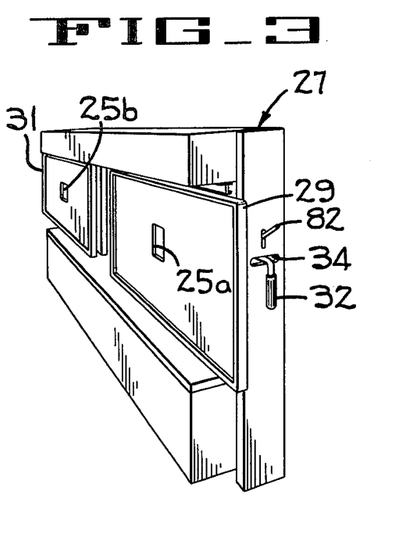
FIG. 3 is a perspective view of the panel support structure useful in the practice of the present invention.

The right end panel on the panel support structure 27 is apparent in FIG. 3. A horizontally elongate slot 34 is shown in the end panel through which extends a downwardly turned bar having a handle 32 on the end thereof. The same type of horizontal slot with a similar handle therethrough is present at the end panel on the left side (not shown) of the support structure 27.

Figures 4A, 7:
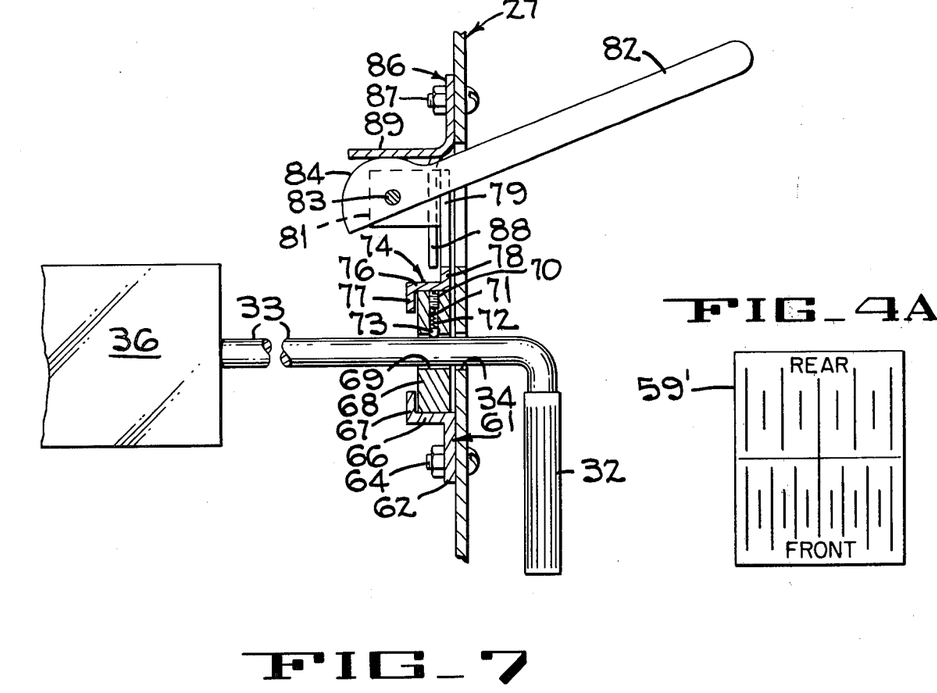
FIG. 4A is a view of an alternative screen for the projection head of FIG. 4.
FIG. 7 is a sectional view of the locking mechanism of the present invention.
Figure 6:
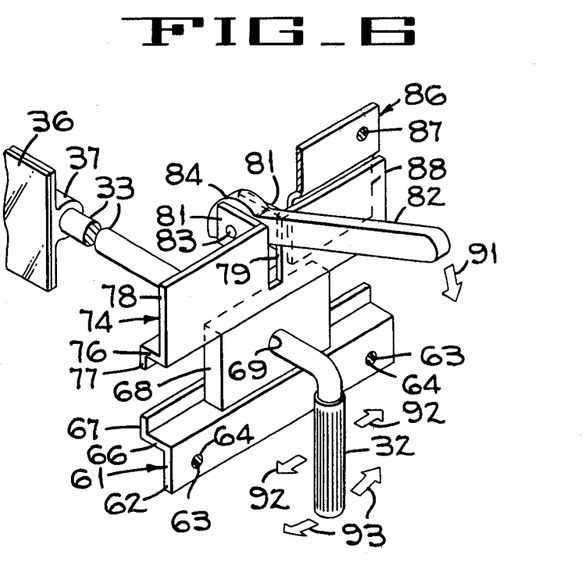
FIG. 6 is a partial perspective view of the locking mechanism of the present invention.

With reference to FIGS. 6 and 7, a mirror bar 33 extends between the handles 32 and through the slots 34. Reflecting surfaces or mirrors 36 are fixedly mounted by means of mirror mounting brackets 37 to the mirror bar 33 so that the reflecting surfaces may be moved either rotationally or longitudinally as the mirror bar is moved rotationally or longitudinally in the slots 34 by the handles 32. The reflecting surfaces are positioned on the mirror bar to occupy an area immediately behind the rectangular openings 25a and 25b in the laterally movable panels 29 and 31 (FIG. 3). The reflecting surfaces are long enough so that full lateral movement of the panels 29 and 31 will always leave some portion of the reflecting surfaces immediately behind the rectangular openings. A light array 24 projected toward the panel 27 will therefore be reflected back toward the projection head 22. It may thus be seen that the handle 32 on the right side of the support structure 27 as seen in FIG. 3 may be moved along the slot 34 to adjust the angle of the reflecting surfaces 36 and therefore the direction of the reflected array relative to the chassis 11 of a vehicle positioned in a space (hoist 28) seen in FIG. 1. In like fashion the handle (not shown) at the opposite end of the structure 27 may be moved in its slot to adjust the angle of the reflecting surfaces relative to the chassis 11. It should be noted that the mirror bar is a continuous member and that movement of either handle 32 on the right or on the left end of the panel structure 27 will move both mirrors 36 at once to assume the same angular orientation relative to a line through the chassis 11.

With reference now to FIG. 8 a description of the positionable targets 26 used in conjunction with the apparatus of the Acraliner wheel aligner system will be described. A left hand positionable target 26 is seen in FIG. 8 having an angled member 38 with upwardly sloping surfaces on opposite sides of the angle as shown. A target face 39 is inscribed on one of the upwardly sloping surfaces having a zero reference line approximately midway of the face and scale marks extending either side of the zero reference line. At the bottom of the sloping face 39, as seen in FIG. 8, a rod 41 is welded to the angled member 38 extending to the left of the angled member in the Figure. The positionable target 26 is thus configured so that the rod 41 may be fixed snugly at that portion of the tire on the left rear wheel 13b which engages the underlying surface with the surface 39 facing forwardly of the vehicle chassis. The edge of the angled member 38 which is adjacent the rod 41 is positioned snugly against the sidewall of the tire on the left rear wheel. The right hand positionable target is a mirror image of the target shown in FIG. 8, wherein the rod 41 extends to the right of the angled member 38 so that the aforementioned positioning of the target may be obtained relative to the tire on the right rear wheel 13a of the vehicle 11. The left and right rear targets 26 when positioned as described herein therefore provide faces 39 upon which the light array 24 may impinge when the targets are situated at the respective rear wheels 13a and 13b.

With reference now to FIG. 5 a description of the clamp 23 adapted to mount the alignment projector head 22 on one of the vehicle wheels will be undertaken. FIG. 5 shows the clamp engaging the rim of the wheel with an outline of the projector head 22 superimposed thereon in phantom lines. The clamp has a center bracket 42 having two parallel bores therethrough (not shown) through which extend a pair of cylindrical rods 43 and 44. A clamp member 46 is positioned near one end of the rods 43 and 44 also having a pair of parallel bores (not shown) therethrough for receiving the rods. Fixed to the opposite end of the rods is a cross member 47 extending in a direction laterally of the rods and having round buttons 48 and 49 fixed to opposite ends thereof. The buttons may have serrated surfaces on the circumference so that they may frictionally engage a portion of the wheel rim. Another button 51 (FIG. 4) is mounted on the clamp member 46 to also engage the wheel rim. It may thus be seen that the wheel rim is engageable at three points thereon by the three buttons 48, 49 and 51. The clamp 23 is initially set on the wheel with the buttons 48 and 49 engaging the wheel rim and the clamp member 46 is slid outwardly until the button 51 also engages the wheel rim. At that point a lever 52 actuating a cam mechanism (not shown) in the clamp member is turned to lock the clamp member in position on the rods 43 and 44 and to slightly urge the button 51 outwardly radially to positively engage the inside of the wheel rim. It should be recognized that this wheel clamp is also useful for engaging the outer side of the wheel rims where the wheel rim configuration is such as to require that type of clamp engagement. The cam mechanism actuated by the lever 52 is configured to urge the button 51 inwardly radially when the buttons 48, 49 and 51 are required to engage the outer surface of a wheel rim.

A compensator plate 53 is mounted to the center bracket 42 by means of three compensator screws which are threadably engaged in threaded holes in the center bracket. The compensator screws have compensator knobs 54 fixed thereto, which when turned cause the screws to turn in their threads. The ends of the compensator screws which engage the compensator plate are rotatably captured in the plate so that when one of the compensator knobs is rotated, the distance between the compensator plate and the center bracket at that compensator screw is changed. It may therefore be seen that the plane of the compensator plate may be varied angularly relative to the plane containing the three wheel clamp buttons 48, 49 and 51. In this manner the compensator plate plane may be changed relative to the rotation plane of the wheel on which the clamp 23 is mounted so that the plane of the compensator plate may be set to be substantially perpendicular to the rotational axis of the wheel. In this fashion, if the plane of the wheel is not perpendicular to the wheel rotation (a condition producing wheel "runout"), the wheel runout may be mechanically removed from the compensator plate. The compensator plate has centrally mounted thereon, in approximate alignment with the rotation axis of the wheel, a stub shaft 56. A more detailed description of the wheel clamp 23 is not considered necessary as this type of wheel clamp is old in this art and the details of such construction do not constitute a part of this invention. Exemplary of such a wheel clamp is the wheel clamp noted as Item No. 14 in the disclosure of U.S. Pat. No. 3,576,372, issued to J. W. Baker, Apr. 27, 1971.

With reference now to FIG. 4 a brief description of the wheel aligner projector 22 will be undertaken. A particular wheel aligner projector which may be used in conjunction with the Acraliner apparatus and which may be used to perform the novel process disclosed herein is fully described in U.S. Pat. No. 3,576,372, issued to J. W. Baker on Apr. 27, 1971. A projector is disclosed therein which has a bore therethrough for receiving the shaft 56 on the compensator plate 53. An internally threaded knob 57 is provided which engages threads on the end of the shaft 56 so that the projector 22 may be tightly gripped between the compensator plate and the knob when the knob is tightened on the shaft threads. It should be noted that under certain circumstances the projector may be allowed to hang pendulously on the shaft so that it does not turn with the wheel on which mounted, but it is more common to position the projector so that the light array 24 emanating from a lens system indicated generally at 58 in FIG. 4 may be directed toward a specific area such as that shown being impinged by the arrows 24 on the laterally movable panels 29 and 31 in FIG. 1.

Above the lens system 58 on the aligner projector 22 is a flat screen area 59 which is adapted to receive a light array such as the array 24 reflected from the reflecting surfaces 36. The reflected light array may be focused to image sharply at the screen 59 by a longitudinal adjustment of the lens holder in the lens assembly 58. The screen 59 has a centrally disposed mark which serves as an indicator for the scale projected onto the screen. A particular portion of a projected scale impinging on the screen may be compared with a portion of a similar scale projected on the screen of a similar projector head mounted on the opposite side of the vehicle chassis.

When the wheel clamp 23 is properly mounted on a wheel rim as hereinbefore described, and the aligner projection head 22 is properly mounted on the wheel clamp, as also hereinbefore described, the light array 24 is projected in a direction wherein a scale reference mark included in the array is projected along a line substantially parallel to the plane of rotation of the wheel on which the head is mounted. The light array projected by the projection head as described in the aforementioned Baker U.S. patent includes a camber reticle, a caster reticle and a toe reticle. Therefore, entire camber, caster or toe scales may be included in the projected light array. For the purposes of the invention disclosed herein the projection of the toe scale is of paramount importance. It should be noted that the light array could consist of a vertical stripe of light projected in a direction substantially parallel to the plane of rotation of the wheel on which the projection head is mounted wherein the light stripe would provide the scale reference mark.

The screen 59 is adapted specifically to receive the projection of an entire toe scale which is projected from the lens assembly 58 and reflected from the mirror surfaces 36 back toward the projection heads 22. In that situation where the light array consists of a vertical light stripe as described herein, one scale for toe measurement will be required at the projection distance of the light stripe from the lens assembly 58 to the reflectors 36 and back to the projection head 22 when the projection heads are mounted on the front wheels, and another larger scale will be required when the projection heads are mounted on the rear wheels and the projection distance is longer. For that purpose a scale adapter 59' may be provided having front and rear scale indicia thereon as seen in FIG. 4A. The scale adapter may be configured to attach to the projection head 22 by engaging the cavity containing the screen 59. When, on the other hand, the light array includes an entire toe scale projection, an oversized screen (not shown) having only a centrally located vertical reference mark thereon may be provided which is adapted to snap into the cavity on the projection head containing the screen 59. The oversized screen will allow a greater proportion of the projected toe scale to appear when the projection heads are mounted on the rear wheels 13a and 13b.

With reference now to FIGS. 6 and 7 the structure which operates to fix the mirror bar translationally once the reflecting surfaces have been properly positioned by the handles 32 will be described. The apparatus shown in FIGS. 6 and 7 is present at both the left and the right end panels of the support structure 27. The structure which is present at the right end panel facing the support structure 27 will be described with the understanding that the structure at the left end panel is a mirror image thereof. A bottom track member 61 has a support leg 62 with mounting holes 64 therethrough. Appropriate fasteners 64 are inserted through the mounting holes and matching holes in the end panel of the support structure to support the bottom track on the inner surface of the end panel. The bottom track has a bearing portion 66 extending at right angles to the support leg 62 and a flange 67 extending upwardly at a right angle to the bearing portion.

A rectangular phenolic brake block 68 has a hole 69 therethrough which receives the mirror bar 33. A bore 71 is formed in the block extending radially from the hole 69. A set screw 70 is threaded into the upper portion of the bore 71. A spring 72 is captured between the set screw 70 and a friction pellet 73 which bears against the periphery of the mirror bar 33 that passes through the hole 69.

A floating or slidable lock member 74 has a bearing portion 76 having a depending flange 77 attached thereto. The bearing portions 66 and 76 on the bottom track 61 and the floating member 74 respectively extend substantially parallel to one another. The phenolic block 68 may be slided back and forth between the two bearing portions by moving the handle 32 so that the mirror bar 33 travels lengthwise in the elongate opening 34 of the end panel on the support structure 27. The depending flange 77 and the upwardly extending flanges 67 serve to capture the brake block in a position adjacent the inside surface of the end panel.

The floating lock member 74 has an upwardly extending flange 78 (best seen in FIG. 6) which has a centrally located slot 79 therein. A pair of cantilevered flanges 81 are attached to the upwardly extending flange 78 on either side of the slot 79 so that they project away from the end panel at an angle of approximately 90° to the flange 78. A mirror bar transverse lock handle 82 is positioned between the flanges 81 and a pivot pin 83, about which the lock handle may be rotated, is projected through aligned holes in the lock handle and the flanges. A cam surface 84 is formed on the lock handle.

A fixed guide shown generally at 86 in FIG. 7 (and partially in FIG. 6) is attached to the inside surface of the end panel of the structure 27 by means such as fasteners 87. The guide member has a guide portion 88 which is spaced from the inside surface of the end panel and extends downwardly so that the upwardly extending flange 78 on the floating lock member is captured between the guide portion 88 and the end panel. The guide portion has a centrally disposed slot so that the cantilevered flanges 81 on the floating lock member may extend therethrough. A tongue portion 89 attached to the guide 86 extends substantially at right angles away from the inside surface of the end panel and overlies the cam surface 84. The underside of the tongue portion serves as a bearing surface for the cam 84.

The cam surface 84 is arranged so that the surface is at a greater distance from the pivot pin 83 as the surface extends in a counterclockwise direction as seen in FIG. 7. With this in mind it may be seen by reference to FIGS. 6 and 7 that a downward motion of the lock handle 82 as indicated by the arrow 91 will cause the pivot pin 83 and therefore the entire floating lock member 74 to assume a position farther below the tongue portion 89. Thus, the bearing portion 76 on the floating lock member exerts a force against the upper edge of the phenolic brake block 68 to cause the brake block to be frictionally fixed between the bearing portions 76 and 66. As a consequence the mirror bar 33 may no longer be moved translationally along the channel formed between the bottom track 61 and the floating lock member 74. Motion of the mirror bar 33 in the direction of the arrows 92 (FIG. 6) is therefore arrested. However, the mirror bar 33 may be moved rotationally about its longitudinal axis by actuating the handle 32 in the direction of the arrows 93 (FIG. 6). The reflecting surfaces 36 are therefore allowed to rotate about the axis of the mirror bar 33, but the orientation of the intersections of the reflecting surfaces and the toe plane relative to a line through the chassis 11 are not allowed to change. When the reflecting surfaces are rotated about the axis of the mirror bar 33, the rotational angle at which the surfaces are set is maintained by friction between the friction pellet 73 and the circumferential surface of the mirror bar contacted by the friction pellet. The friction level may be set by adjustment of the set screw 70 which varies the amount of compression in the spring 72. It may therefore be seen that once the reflecting surfaces 36 are set at a particular angle relative to a reference line drawn through the chassis 11, the lock handles 82 at each end panel of the support structure 27 may be lowered so that there will be no deviation from the set reflecting surface angles in the toe plane until all desired measurements are taken. At the same time the reflecting surfaces may be rotated so that a reflected light array 24 may be directed to impinge upon a desired surface for reading such as the screen 59 on the projection head 22.

Having described a wheel alignment apparatus for use in aligning the toe of wheels supporting a vehicle chassis, attention will now be drawn to a method for utilizing such apparatus in providing toe alignment for all four of the wheels, including the front steerable wheels 12a and 12b and the rear non-steerable wheels 13a and 13b, supporting the chassis. By way of review it should be noted that four wheel clamps 23 are provided in the apparatus together with two positionable targets 26 and two aligner projection heads 22. The procedure involves positioning the vehicle chassis in a location adjacent to the panel support structure 27 by locating the vehicle in fixed position, such as on the hoist 28. A wheel clamp 23 is attached to each of the four wheels and with an aligner projection head 22 mounted thereon each wheel is elevated by a jack on the hoist to clear the underlying surface. The compensator knobs 54 are properly adjusting to remove wheel runout from the compensator plate 53 on which the aligner projector is mounted as evidenced by the stability of the projected light array when the wheel is turned on its rotation axis. The aligner projection heads are then mounted on the clamps on the front steerable wheels. The positionable targets 26 are positioned with the right hand target 26 adjacent the right rear wheel 13a and the left hand target shown in FIG. 8 positioned in a similar fashion adjacent the left rear wheel 13b. The aligner projection heads 22 are positioned to direct the light arrays 24 rearwardly to strike the positionable targets. The front steerable wheel pair is then adjusted in steering until the scale reference marks on the projected arrays strike similar points as indicated on the scales on the faces 39 of the positionable targets. The aligner projection heads are then reoriented to project the light array forwardly to strike the reflecting surfaces through the rectangular openings 25a and 25b in the panels 29 and 31. The orientation of the mirror bar 33 is then adjusted by manually engaging the handles 32 extending from either end of the support structure 27 and positioning the mirrors until the reflected scale reference marks strike the head screens 59 at similar points thereon. The mirror bar is locked translationally in the elongate openings 34 at each end panel of the panel support structure 27 by means of the apparatus shown in FIGS. 6 and 7 or apparatus similar thereto so that the reflecting surfaces 36 are locked in position in the toe plane. The vehicle steering wheel 16 is then positioned in a desired straight ahead steering position as seen in FIG. 2. Steering systems and adjustment mechanism for setting the toe of steerable front wheels are well known to those of skill in this art. The toe of each front wheel is then set to a desired toe position using the projected light arrays and their reflections on the screens 59 of the aligner projection heads 22 as toe position indicators for each of the front wheels. The toe is generally set to be the same at each front wheel, although certain driving conditions such as prominent local road crowns might dictate a predetermined unequal front wheel toe setting. The front wheel toe setting is relative to the chassis centerline 21 passing through the points 17 and 18 (FIG. 2) because the reflecting surfaces are set to be perpendicular to the chassis centerline. This is accomplished when the front wheel steering is set so that the light arrays are symmetrical about a line (centerline 21) passing through a point midway between the rear wheels (the step of steering to obtain similar rear positional target readings at each side of the vehicle) and by setting the reflecting surfaces 36 to be orthogonal to the bisector of the angle (chassis centerline 21) between the rotational planes of the front wheels without changing the steering.

The pair of aligner projection heads 22 are removed from the front wheels and mounted on the rear wheels 13a and 13b. The light arrays 24 are projected forwardly to impinge upon the reflecting surfaces 36 through the respective openings 25a and 25b in the panels 29 and 31. The toe of the rear wheels is then set by adjustments (when available) known to those of skill in this art to obtain desired toe position settings at each of the rear wheels.

The projected light arrays from the aligner heads are reflected by the respective portions of the reflecting surfaces 36 to impinge on the screens 59 on the aligner heads. As mentioned hereinbefore, an enlarged screen may be provided as an attachment at the aligner head to capture a larger portion of the toe scale projection. As also mentioned hereinbefore, in the event the light array is in the form of a vertical light stripe, a scale may be provided on the screen 59 in the form shown in FIG. 4A so that toe adjustments may be undertaken for both front and rear wheels using the projected light array. It has been found that such scales will provide for toe settings at both front and rear wheels to an adequate degree of accuracy for a wide variety of passenger vehicle wheel based dimensions. The foregoing process thereby provides for toe settings for both the front and the rear wheels with reference to the vehicle chassis centerline 21 as seen in FIG. 2.

In another aspect of the invention a process is disclosed wherein the four mounting clamps 23 are mounted on the wheels 12a, 12b, 13a and 13b and the mounting surfaces for the aligner projection heads are adjusted to remove the effect of wheel runout at the aligner projection heads as hereinbefore described. The aligner projection heads are then mounted on the clamps on the front wheels and the left and right positional targets 26 are situated against the rear wheels as hereinbefore described. It should be noted that the positionable targets are positioned in the manner disclosed to place them approximately equidistant from the centerpoint 18 (FIG. 2) between the rear wheel pair. Consequently, any chassis reference which provides similar positioning of the targets relative to the midpoint 18 is acceptable for this portion of the disclosed wheel alignment method. The aligner projection heads 22 are positioned to project the light array 24 rearwardly to strike the positionable targets. The front wheels 12a and 12b are adjusted in steering direction by manipulation of the steering wheel 14 so that the light arrays impinge on the faces 39 of the targets at similar points thereon as indicated by the target scale indicia. The alignment heads are then positioned on the front wheels so that the light array is projected forwardly so that a portion of the array passes through the rectangular openings 25a and 25b in the laterally adjustable panels 29 and 31. The mirror bar 33 is adjusted in position by manipulation of the handles 32 on each side of the support panel 27 until the reflected light array reference marks fall on similar points on the screens 59 on the aligner heads. The mirror bar translational locks are engaged by lowering the handles 82. The aligner heads are then dismounted from the clamps on the front wheels and mounted on the clamps on the rear wheels 13a and 13b. The mirror bar may be moved rotationally about its longitudinal axis both before and after locking by the mechanism shown in FIGS. 6 and 7 so that vertical positioning of the reflected light array 24 may be obtained to provide for impingement of the light array on the screens 59 on the aligner projection heads. The toe of the rear wheels is then set so that it is approximately equal in each rear wheel as indicated by the positions of the light arrays 24. Some vehicles do not have mechanisms for setting the toe of the rear wheels and for a number of other reasons the rear wheel toe may not be set to be exactly the same on each side of the vehicle although it may be well within the vehicle manufacturer's specifications. After whatever rear wheel toe setting is undertaken, the translational locks for the mirror bar 33 are released and the mirror bar is readjusted to a point where the rear toe indications on the screens (59, 59') are equal on each side of the vehicle. The mirror bar translational locks are re-engaged to prevent movement of the mirror bar in the direction of the arrows 92 (FIG. 6). The reflecting sufaces 36 are thereby set to be orthogonal to a direction along the bisector of the total toe angle between the rear wheels. This direction is known as the rear rolling direction (RRD) and is the direction in which the front wheels must be steered for the vehicle to roll straight ahead on a flat surface.

The aligner projection heads are then moved to the wheel clamps on the front wheels 12a and 12b the vehicle steering wheel 14 is placed in a rotational orientation desired for straight ahead steering. The steering wheel may be clamped in this position if so desired. The front wheel toe is thereafter set to that desired at each front wheel using the projected light arrays reflected to the aligner projection head screens 59 as an indicator of the front toe position. As mentioned hereinbefore it is generally desirable to split the front toe about the reference, which in this instance is the RRD. However, this process envisions intentionally unequal toe settings at the front wheels for special driving circumstances. Consequently the rear wheel toe settings are set so that the bisector of the total toe angle between the rear wheels may not be colinear with the centerline 21 passing through the midpoints 18 and 17 between the rear and front wheel pairs respectively (FIG. 2), but may deviate from the chassis centerline by some tolerable angle. The direction of this deviation, the RRD, is thereafter used as the reference direction for the setting of the front wheel toe by virtue of the second mentioned adjustment of the translational orientaton of the reflecting surfaces 36.

Although the best mode contemplated for carrying out the present invention has been herein shown and described, it will be apparent that modification and variation may be made without departing from what is regarded to be the subject matter of the invention.

What is claimed is:

1. A method of setting toe for wheels supporting the chassis of a vehicle having pairs of steerable front and nonsteerable rear wheels, and a steering wheel for controlling the steerable wheels, utilizing apparatus including a pair of reversible alignment projector heads having projecting screens thereon and operating to project a light array in a direction substantially parallel to the plane of rotation of a wheel on which mounted, the array including a scale reference mark, a support structure adapted to be situated at one end of a position for receiving the vehicle, wherein the support structure has a mirror bar supported therein which is adjustable in orientation and which has reflecting surfaces mounted thereon, a pair of positionable targets, and wheel clamps adapted to be mounted on the wheels and to receive the projector heads, comprising the steps of mounting the pair of alignment heads one on each of the steerable front wheels, placing one of the positionable targets on each side of and at the rear of the chassis substantially equidistant from a point midway between the rear wheel pair, projecting the light arrays rearwardly to strike the positionable targets, steering the front wheel pair until the scale reference marks strike similar points on the positionable targets, projecting the light arrays forwardly to strike the reflecting surfaces attached to the mirror bar, adjusting the orientation of the mirror bar until the reflected scale reference marks strike the alignment head projection screens at similar points thereon, rotating the steering wheel to a centered steering position, setting the toe of each front wheel to desired toe position using the projected light arrays as toe position indicators, mounting the pair of alignment heads one on each of the rear wheels, projecting the light arrays forwardly, and setting the toe of each rear wheel to desired toe position using the projected light arrays as toe position indicators.

2. The method of claim 1 wherein the step of adjusting the orientation of the mirror bar includes the step of locking the mirror bar in position in the toe plane.

3. The method of claim 1 wherein the wheel clamps have alignment head mounting plates thereon and wherein the steps of mounting the pair of alignment heads on the front and rear wheels comprises the steps of mounting one of the wheel clamps on each of the wheels, mounting one of the alignment heads on one of the mounting plates, elevating the wheel with the head mounted thereon to clear the underlying surface, and adjusting the attitude of the mounting plate to compensate for wheel runout.

4. The method of claim 1 wherein the steps of projecting the light arrays includes the step of projecting an entire toe measurement scale, whereby scale factor is unchanged for alignment heads mounted on either the front or rear pair of wheels.

5. The method of claim 1 wherein the steps of projecting the light arrays includes the step of projecting a relatively narrow beam having a component in the toe plane, and wherein the steps of setting the toe of the front and rear wheels includes using one scale on the head projection screen when the alignment heads are mounted on the front wheels and another scale when the heads are mounted on the rear wheels.

6. A method of setting toe for four wheels supporting a vehicle chassis having two steerable front wheels controlled by a steering wheel and two nonsteerable rear wheels, utilizing apparatus including a pair of reversible projector heads each having a projection screen thereon and operating to project a light array in a direction substantially parallel to the rotation plane of a wheel on which the head is mounted, said array including a scale reference mark, a support structure situation at one end of a position for receiving the vehicle, the support structure having a mirror bar mounted therein which is adjustable in orientation and which has reflecting surfaces mounted thereon, a pair of positionable targets, and wheel clamps adapted to be mounted on the wheels and to receive the projector heads, comprising the steps of mounting one of the alignment heads on each of the pair of front wheels, placing one of the positionable targets on each side of and at the rear of the chassis substantially equidistant from a point midway between the rear wheel pair, projectng the light arrays rearwardly to impinge on the positionable targets, steering the front wheel pair until the scale reference marks strike similar points on the positionable targets, projecting the light arrays forwardly to strike the reflecting surfaces on the mirror bar, adjusting the orientation of the mirror bar until the reflected scale reference marks strike the head screens at similar points thereon, mounting one of the alignment heads on each of the pair of rear wheels, projecting the light arrays forwardly, setting the toe of each rear wheel to be approximately the same using the projected light arrays to indicate toe position, readjusting the mirror bar orientation so that the toe of each rear wheel is substantially the same using the projected light arrays to indicate toe position, mounting one of the alignment heads on each of the pair of front wheels, projecting the light arrays forwardly, rotating the steering wheel to a centered steering position, and setting the toe of each front wheel to desired toe position using the projected light arrays as toe position indicators.

7. The method of claim 6 wherein the steps of adjusting and readjusting the mirror bar orientation include the step of locking the mirror bar in position in the toe plane.

8. The method of claim 6 wherein the wheel clamps have alignment head mounting plates thereon and wherein the steps of mounting the pair of alignment heads on the front and rear wheels comprises the steps of mounting one of the wheel clamps on each of the wheels, mounting one of the alignment heads on one of mounting plates, elevating the wheel with the head mounted thereon to clear the underlying surface, and adjusting the attitude of the mounting plate to compensate for wheel runout.

9. The method of claim 6 wherein the steps of projecting the light arrays includes the step of projecting an entire toe measurement scale, whereby scale factor is unchanged for alignment heads mounted on either the front or rear pair of wheels.

10. The method of claim 6 wherein the steps of projecting the light arrays includes the step of projecting a relatively narrow beam having a component in the toe plane, and wherein the steps of setting the toe of the front and rear wheels includes using one scale on the head projection screen when the alignment heads are mounted on the front wheels and another scale when the heads are mounted on the rear wheels.

11. In apparatus for setting the toe of front steerable and rear nonsteerable wheels supporting a vehicle chassis, wherein a pair of wheel mountable reversible projector heads having projection screens thereon operate to project a light array in a direction substantially parallel to the plane of rotation of a wheel on which mounted, a support structure is situated at one end of a position for receiving the vehicle, a mirror bar is supported within the support structure so that it is adjustable in orientation therein, reflecting surfaces are mounted on the mirror bar, and wheel clamps are adapted to be mounted on the wheels and to receive the projector heads thereon, the improvement comprising a fixed track member attached to the support structure, a brake block positioned for sliding movement adjacent to said fixed track member and having a through hole for receiving the mirror bar therethrough, a floating lock member positioned on the support structure for movement toward and away from the side of said brake block remote from said fixed track member, a manually engageable lock handle movable relative to the support structure and adjacent said floating lock member to selectively move the same between a position in frictional engagement with said brake block and an out of the way position, whereby said mirror bar may alternately be fixed and movable translationally relative to the support structure.

* * * * *